United States Patent
Chiang et al.

(10) Patent No.: US 7,085,861 B2
(45) Date of Patent: Aug. 1, 2006

(54) SERIAL ATA CONTROL CIRCUIT FOR AUTOMATICALLY SWITCHING CONNECTION PATH

(75) Inventors: Chinyi Chiang, Taipei (TW); Tse-Hsien Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 148 days.

(21) Appl. No.: 10/638,414

(22) Filed: Aug. 12, 2003

(65) Prior Publication Data

US 2004/0088441 A1 May 6, 2004

(30) Foreign Application Priority Data

Nov. 4, 2002 (TW) .............................. 91132453 A

(51) Int. Cl.
*G06F 3/00* (2006.01)
(52) U.S. Cl. .................... 710/38; 710/33; 710/36; 710/51; 710/316; 711/100
(58) Field of Classification Search ................ 710/33, 710/36, 51, 38, 316; 709/212–216; 711/100
See application file for complete search history.

(56) References Cited

U.S. PATENT DOCUMENTS

| | | | |
|---|---|---|---|
| 6,381,675 B1* | 4/2002 | Okada | 711/114 |
| 6,845,420 B1* | 1/2005 | Resnick | 710/303 |
| 6,854,045 B1* | 2/2005 | Ooi et al. | 711/202 |
| 2005/0021887 A1* | 1/2005 | Benson et al. | 710/38 |

* cited by examiner

*Primary Examiner*—Fritz Fleming
*Assistant Examiner*—Eron Sorrell
(74) *Attorney, Agent, or Firm*—Rosenberg, Klein & Lee

(57) ABSTRACT

A serial ATA control circuit is provided. The control circuit includes a plurality of serial ATA controllers, a plurality of port controlling circuits, a plurality of switch devices, and a switch controller. Each of the serial ATA controllers has a memory accessing controller and two transceivers. The serial ATA control circuit is connected to at least one serial ATA device through the port controlling circuits. The a plurality of port controlling circuits are connected to corresponding serial ATA controllers through the plurality of switch devices controlled by the switch controller. The connection path between each port controlling circuit and corresponding serial ATA controller is selected by the switch controller to achieve optimal data transfer rate.

9 Claims, 2 Drawing Sheets

SERIAL ATA CONTROL CIRCUIT FOR AUTOMATICALLY SWITCHING CONNECTION PATH

FIELD OF THE INVENTION

The present invention relates to a serial ATA control circuit, more particularly, to a serial ATA control circuit for automatically switching a connection path by a switch controller to achieve optimal data transfer rate.

BACKGROUND OF THE INVENTION

The storage device interfaces are demanded with more versatility, larger capability and higher data transfer rate. For example, the serial ATA (SATA) interface is developed to provide higher transfer rate (about Gbps) over conventional parallel ATA interface.

FIG. 1 shows a prior art serial ATA control circuit, which comprises a first serial ATA controller 12 and a second serial ATA controller 14. The first serial ATA controller 12 comprises a first memory accessing controller 121, a first transceiver 123 and a second transceiver 125. The second serial ATA controller 14 comprises a second memory accessing controller 141, a third transceiver 143 and a fourth transceiver 145. The first transceiver 123, the second transceiver 125, the third transceiver 143 and the fourth transceiver 145 are connected to serial devices through a first port 127, a second port 129, a third port 147 and a fourth port 149, respectively.

The conventional serial ATA connectors generally have identical appearance, which will hinder the user to identify the connectors being connected to the same serial ATA controller or not. Occasionally, two serial ATA devices are connected to two ports with associated transceivers belonging to the same serial ATA controller. In this situation, the two serial ATA devices can not access data at the same time because one serial ATA device is set to be master and another serial ATA device is set to be slave.

SUMMARY OF THE INVENTION

It is an object of the present invention to provide a serial ATA control circuit for automatically switching a connection path. The serial ATA control circuit has a plurality of switch devices bridging between the port controlling circuits and the transceivers thereof for selectively setting connection paths therebetween.

It is another object of the present invention to provide a serial ATA control circuit for automatically switching a connection path, which has a switch controller to detect a connection status of the serial ATA control circuit with respect to serial ATA device and to determine the connection paths between the port controlling circuits and the transceivers.

It is still another object of the present invention to provide a serial ATA control circuit for automatically switching a connection path, wherein the switch device thereof has a plurality of switches turned on or off to switch the connection paths between the port controlling circuits and the transceivers.

It is still another object of the present invention to provide a serial ATA control circuit for automatically switching a connection path, wherein the switch device thereof is a multiplexer to switch the connection paths between the port controlling circuits and the transceivers.

The various objects and advantages of the present invention will be more readily understood from the following detailed description when read in conjunction with the appended drawing, in which:

DETAILED DESCRIPTION OF THE INVENTION

Figure 1:
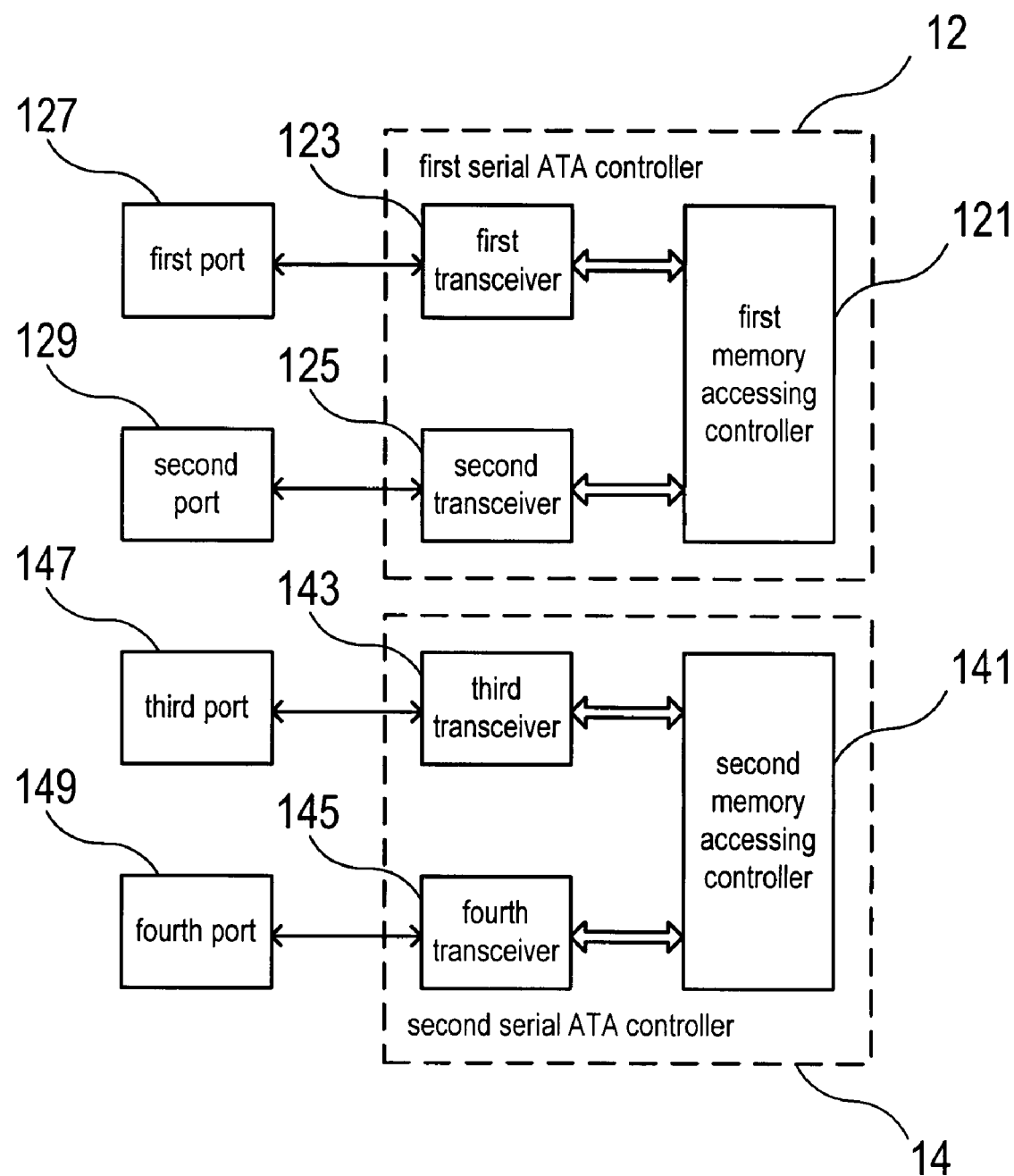
FIG. 1 shows a schematic diagram of prior art serial ATA control circuit.
Figure 2:
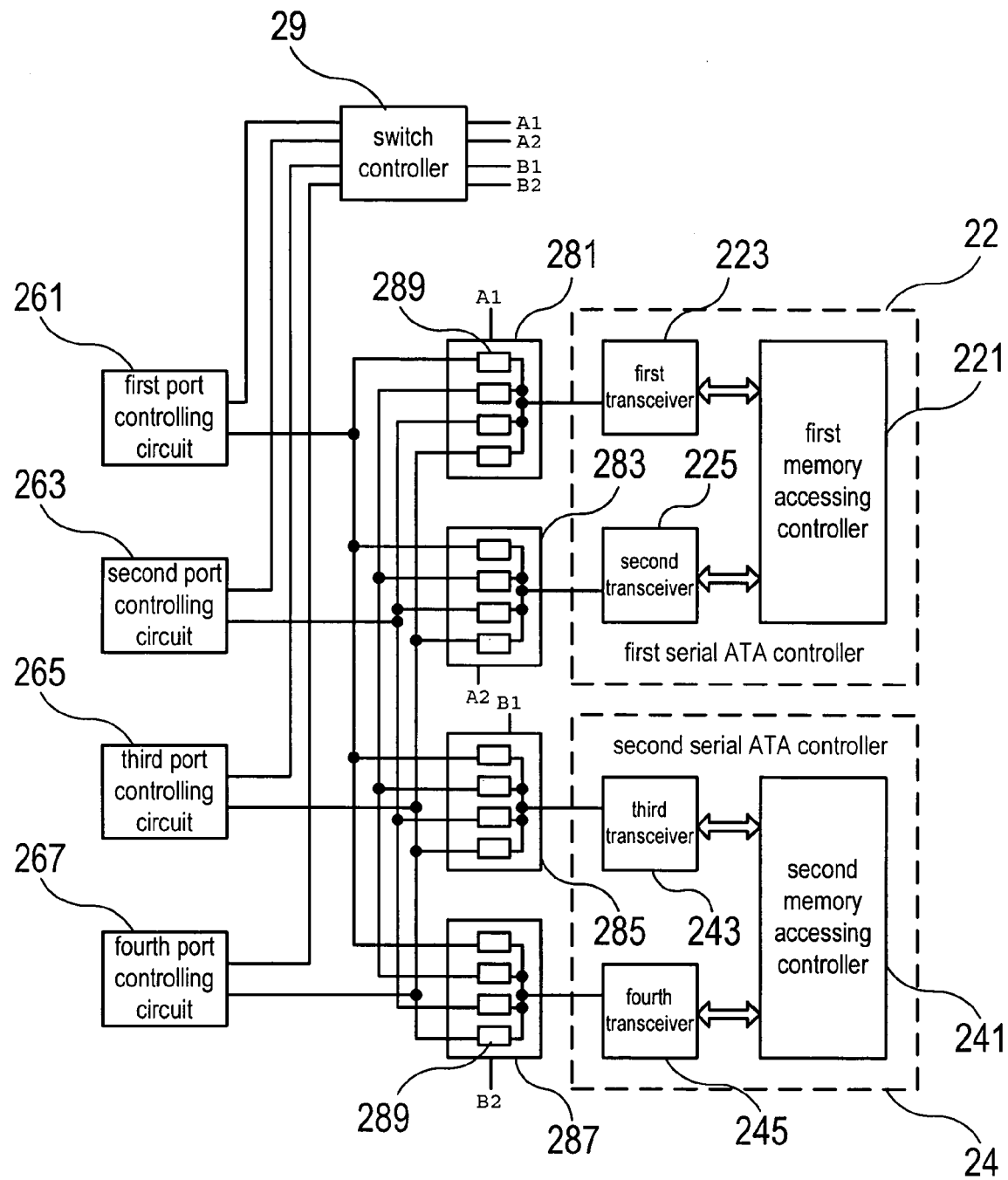
FIG. 2 is a schematic diagram of a serial ATA control circuit of the present invention.

FIG. 2 shows a block diagram of a preferred embodiment according to the present invention, which is exemplified with two serial ATA controllers. As shown in this figure, a first serial ATA controller 22 comprises a first memory accessing controller 221, a first transceiver 223 and a second transceiver 225. The first transceiver 223 and the second transceiver 225 are connected to a first port controlling circuit 261, a second port controlling circuit 263, a third port controlling circuit 265 and a fourth port controlling circuit 267 through two switch devices 281 and 283.

Moreover, a second serial ATA controller 24 comprises a second memory accessing controller 241, a third transceiver 243 and a fourth transceiver 245. The third transceiver 243 and the fourth transceiver 245 are connected to the first port controlling circuit 261, the second port controlling circuit 263, the third port controlling circuit 265 and the fourth port controlling circuit 267 through two switch devices 285 and 287.

Moreover, a switch controller 29 has a plurality of detecting ends connected to the first port controlling circuit 261, the second port controlling circuit 263, the third port controlling circuit 265 and the fourth port controlling circuit 267, and a plurality of output ends connected to the switch devices 281 to 287. The switch controller 29 detects a connection status for each of the first port controlling circuit 261, the second port controlling circuit 263, the third port controlling circuit 265 and the fourth port controlling circuit 267 to a corresponding serial ATA device (not shown). Afterward, the switch controller 29 generates control signal to the switches through the output ends. The connection path between the controlling circuit and the transceiver can be selected to achieve best data transfer performance.

For example, when a first serial ATA device (not shown) is connected to a connector corresponding to the first port controlling circuit 261 and no other serial ATA device is connected, the switch controller 29 will control the switch devices to connect the first port controlling circuit 261 to one transceiver of any serial ATA device (such as the first transceiver 223). In this situation, the first serial ATA device is operated at master mode.

When a second serial ATA device (not shown) is connected to a connector corresponding to other port controlling circuit (such as the second port controlling circuit 263), the switch controller 29 will command the switch devices 285 and 287 to connect the second port controlling circuit 263 to one of the third transceiver 243 and the fourth transceiver 245. More particularly, the second serial ATA device will be accessed through the second serial ATA controller 24 because the first serial ATA controller 22 has already been used.

Moreover, when more serial ATA device is connected to remaining connector of the serial ATA control circuit, the switch controller 29 will connect corresponding port controlling circuit to any of remaining transceivers. The newly connected serial ATA device is operated at slave mode.

By the serial ATA control circuit of the present invention, the second serial ATA device can be ensured to operate at master mode even more serial ATA device is connected to remaining connector of the serial ATA control circuit. In other word, the switch controller 29 of the serial ATA control circuit can automatically set other newly added serial ATA device to slave mode, thus ensuring both the first serial ATA device and the second serial ATA device are operated in master mode and having optimal transfer rate.

Moreover, the switch device described above can be implemented by a plurality of switches 289 each having input end connected to corresponding port controlling circuit. The switch controller 29 of the serial ATA control circuit controls the turning on/off of each switch 289 to control a connection path between any port controlling circuit and the corresponding transceiver. Moreover, the switch device described above can also be implemented by multiplexer.

The switch rule of the switch controller 29 can be set in BIOS or by software in operation system. Alternatively, the switch controller 29 can also be operated manually or automatically by detecting hardware.

To sum up, the serial ATA control circuit for automatically switching a connection path according to the present invention can automatically switch connection path between the port controlling circuits and the transceivers thereof. The data transfer efficiency of serial ATA devices connected to the serial ATA control circuit can be greatly enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A serial ATA control circuit for automatically switching a connection path, comprising
    a plurality of serial ATA controllers, each having at least one memory accessing controller and at least two transceivers;
    a plurality of switch devices each being coupled to a respective one of said transceivers; and,
    a plurality of port controlling circuits, each of said plurality of port controlling circuits being selectively connected to any one of said transceivers by a corresponding one of said switch devices and isolated from the remaining ones of said transceivers by remaining ones of said switch devices, wherein a number of devices equal to or less than said plurality of serial ATA controllers connected to any of said plurality of port controlling circuits are connected to a different one of said memory accessing controllers by said plurality of switch devices.

2. The serial ATA control circuit as in claim 1, wherein each said switch device has a plurality of switches, each of said plurality of switches having one end connected to a corresponding one of said port controlling circuits and another end connected to one of said transceivers.

3. The serial ATA control circuit as in claim 2 further comprising a switch controller having a plurality of detecting ends respectively connected to said plurality of port controlling circuits for detecting a presence of devices connected thereto and a plurality of output ends respectively connected to said plurality of switch devices, each of said output ends sending a control signal to each of said switch devices for selecting a connection path between each of said port controlling circuits having a device connected thereto and said respective transceiver.

4. The serial ATA control circuit as in claim 3, wherein said switch controller sends said control signal to turn on or off each of said switches.

5. The serial ATA control circuit as in claim 1, wherein said switch device is a multiplexer.

6. The serial ATA control circuit as in claim 3, wherein said switch controller is programmable.

7. A serial ATA control circuit for automatically switching a connection path, comprising;
    a plurality of serial ATA controllers, each having at least one memory accessing controller and at least two transceivers;
    a plurality of switch devices, each of said plurality of switch devices having one end connected to a corresponding one of said transceivers;
    a plurality of port controlling circuits, each of said port controlling circuits being connected to each of said plurality of switch devices; and,
    a switch controller having a plurality of detecting ends respectively connected to said plurality of port controlling circuits for detecting a presence of devices connected thereto and a plurality of output ends respectively connected to said switch devices, said switch controller being operable to provide a control signal to each of said switch devices so as to connect thereby one of said port controlling circuits to one of said transceivers and to isolate said one of said port controlling circuits from remaining ones of said transceivers, wherein a number of devices equal to or less than said plurality of serial ATA controllers connected to any of said plurality of port controlling circuits are connected to a different one of said memory accessing controllers by said switch devices.

8. The serial ATA control circuit as in claim 7, wherein said switch device has a plurality of switches, each of said plurality of switches having one end connected to a corresponding one of said port controlling circuits and another end connected to one of said transceivers.

9. The serial ATA control circuit as in claim 7, wherein said switch device is a multiplexer.

* * * * *